(12) United States Patent
Falk

(10) Patent No.: US 6,327,052 B1
(45) Date of Patent: Dec. 4, 2001

(54) COLOR DATA INVERSION AND RECONVERSION

(75) Inventor: Richard A. Falk, San Mateo, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/107,044

(22) Filed: Jun. 29, 1998

(51) Int. Cl.$^7$ .............................. G06F 15/00; G03F 3/08
(52) U.S. Cl. ............................................ 358/1.9; 358/523
(58) Field of Search ................................... 358/539, 518, 358/523, 530, 1.9, 1.17, 1.6

(56) References Cited

U.S. PATENT DOCUMENTS

| | | | |
|---|---|---|---|
| 5,225,817 | * 7/1993 | Long | 358/518 |
| 5,335,097 | * 8/1994 | Murakami | 358/518 |
| 5,479,189 | 12/1995 | Chesavage et al. | 345/154 |
| 5,612,795 | * 3/1997 | Dichter | 358/518 |
| 5,764,796 | * 6/1998 | Smith | 382/167 |
| 6,130,961 | * 10/2000 | Akioka et al. | 382/167 |

FOREIGN PATENT DOCUMENTS

| | | |
|---|---|---|
| 0 338 457 A1 | 10/1989 | (EP) . |
| 0 454 275 A2 | 10/1991 | (EP) . |
| 0 501 942 A1 | 2/1992 | (EP) . |
| 0 531 891 A2 | 3/1993 | (EP) . |
| WO 92/06557 | 4/1992 | (WO) . |
| WO 95/31794 | 11/1995 | (WO) . |

* cited by examiner

Primary Examiner—Cheukfan Lee
(74) Attorney, Agent, or Firm—Michael A. Glenn

(57) ABSTRACT

A color data inversion and reconversion system provides improved systems, methods, and data structures for processing and printing color data which convert colorant amounts (c, m, y, k) for pixels into corresponding color amounts (r', g', b') for the pixels and to accurate colorant amounts (c', m', y', k') for the pixels. This supports accurate printing of such pixels even where the colorant amounts (c, m, y, k) are inaccurate, and can be used where the colorant amounts (c. m. y. k) were determined via a substantially reversible process in response to a set of color amounts (r, g, b).

29 Claims, 5 Drawing Sheets

Microfiche Appendix Included
(2 Microfiche, 110 Pages)

500

Determine, in response to first colorant COLORANT_1, second color COLOR_2 which substantially matches first color COLOR_1.

↓

Match second color COLOR_2 to second colorant COLORANT_1 which substantially matches first color COLOR_1.

COLOR DATA INVERSION AND RECONVERSION

A portion of the disclosure of this patent document contains material which is subject to copyright protection. The copyright owner has no objection, subject to the provisions of 37 C.F.R. § 1.14, to the facsimile reproduction by any one of the patent disclosure, as it appears in the Patent and Trademark Office patent files or records, but otherwise reserves all copyright rights whatsoever.

MICROFICHE APPENDIX

This application contains a Microfiche Appendix consisting of two (2) slides and 110 frames.

BACKGROUND OF THE INVENTION

1. Field of the Invention

The present invention pertains to post processing color data. More particularly, the present invention pertains to post processing possibly inaccurate color data to generate accurate color data.

2. Description of the Related Art

Processing and printing of color data has become an increasingly important area in both computer engineering and printing technology. Color data can currently be processed and printed on a wide variety of commonly available computer systems. Unfortunately, some computer based printing systems in common use do not provide high quality color prints. Color data printed by these conventional systems frequently have inaccurate color hues and excessive saturation values.

As an aid for understanding the limitations of conventional color data processing, it is desirable to describe here various concepts of color data processing. Color data typically is displayed on raster displays, such as the common cathode ray tube (CRT) monitor. The viewing surface of a raster display includes a rectangular array of picture elements (pixels). Each pixel comprises a smallest area on the display surface that can be assigned independent characteristics, such as color and radiant intensity. In typical displays, each pixel comprises a red R color dot, green G color dot, and blue B color dot, which when activated respectively emit red R, green G, and blue B light. The R, G, and B color dots of a pixel are in close proximity with one another so that light emitted from the color dots appears to mix. Consequently, by selectively varying the intensity of light emitted from each of the three color dots, the pixel can emit a broad range of colors over a broad range of radiant intensity.

To selectively control the appearance of a pixel, a color amount is produced for each color dot of the pixel. The color amounts can be represented in the form (r, g, b), where r controls illumination of the R color dot, g control illumination of the G color dot, and b controls illumination of the B color dot. The color amounts r, g, and b weight the amount of light to be emitted by color dots R, G, and B respectively. Such color amounts (r, g, b) are often referred to as RGB data. The totality of all possible color amounts for a given set of weighted colors forms a color space. Thus, for primary colors R, G, and B, the totality of possible color amounts (r, g, b) forms an RGB color space.

The RGB color space used for a particular display may reflect characteristics of that display. For example, the color amounts (r, g, b) for a CRT monitor typically have been raised by an exponent γ, where γ is referred to a gamma value for the CRT monitor. This exponentiation by γ allows the perceived brightness of the CRT monitor to change in a somewhat linear manner. That is, a fixed magnitude change in a color amount r, g, or b appears to yield the same increase in radiant intensity of R, G, or B light regardless of the magnitudes of the color amounts r, g, and b prior to the change.

Printing of colors described using RGB data is complicated because displayed colors are additive whereas printed colors are subtractive. Displayed colors are additive because when two colors are combined together (added on a display), the result is a third color having a frequency distribution which is approximately the sum of the frequency distributions of the two colors. The third color may also be brighter than the other two colors. Printed colors are subtractive because when a printed color is illuminated with light IL, the printed color absorbs a given frequency distribution FD of the light IL, and appears to have the color of that portion of light IL-FD which is reflected. Thus, a printed color can appear to change colors when the color of an illuminating light is changed. Further, combining two printed colors results in a darker third color.

To print color data, a processor converts color amounts for each pixel to colorant amounts for each pixel. Typically, the colorant amounts have the form (c, m, y, k) and respectively weight amounts of cyan (C), magenta (M), yellow (Y) and black (K) colorants. Such colorants are affixed to a printable medium to produce printed colors. The totality of all colorant amounts for a given set of colorants comprises a colorant space. C, M, Y, K are referred to as primary colorants of a CMYK colorant space. Usually, a distinct set of colorant amounts (c, m, y, k) is used for printing each pixel.

The colorant amounts (c, m, y, k) determined by some conventional systems are inaccurate. For example, when conversion from color amounts (r, g, b) to colorant amounts (c, m, y, k) is accomplished in accordance with the protocol set forth by the POSTSCRIPT® LEVEL 1 Language as specified by ADOBE SYSTEMS, INCORPORATED, printed colorant amounts sometimes look too gray and desaturated, particularly for printing photographic data. Further, the pure colors RGB and colorants CMY are not inverts of one another. Thus, green G displayed a monitor is much lighter than correspondence cyan C plus magenta M on a print. Further, a green G plus blue B color has a light cyan C appearance when displayed on a monitor but prints as a much darker and somewhat bluer cyan C.

It can be difficult to avoid such inaccurate color conversions when managing color data. For example, in CORELDRAW® from COREL, retaining the original RGB data typically cannot be accomplished, and the user conventionally must print inaccurate colorant amounts determined according to the POSTSCRIPT® LEVEL 1 conversion protocol, or use the color management system in CORELDRAW® which may not be appropriate for a given printer.

There is thus a continuing need for an improved system and method for converting between color data formats. Such system and method should be compatible with conventional systems, and preferably should be able to convert possibly inaccurate colorant amounts (c, m, y, k) obtained with conventional systems to accurate colorant amounts for printing color data. Further, such system and method should preferably be easy to operate by end users.

SUMMARY OF THE INVENTION

According to the present invention, a color data processing system and color data processing method are provided for processing and printing color data. Computer readable media and data structures for implementing and performing such color data processing system and method are also provided in accordance with the present invention.

In accordance with a first aspect of the present inventions the color data processing system post processes an output signal which was produced from an input signal according to a first signal processing protocol. For example, the first signal processing protocol may be an inaccurate color to colorant conversion protocol. The color data processing system includes first and second color data processing subsystems. The first color data processing subsystem receives the output signal and produces an intermediate signal according to a second signal processing protocol. The second signal processing protocol preferably substantially inverts the first signal processing protocol. Thus, if the first signal processing protocol converts original color amounts to inaccurate colorant amounts, then preferably, the intermediate signal substantially represents the original color amount within limits of gamut. The second color data processing subsystem receives the intermediate signal from the first color data processing subsystem, and produces a final signal according to a third signal processing protocol. The intermediate signal preferably has the same format as the input signal and the final signal preferably has the same format as the output signal. For example, the third signal processing protocol may comprise an accurate color to colorant conversion protocol which receives color amounts from the second signal processing protocol and converts them to accurate colorant amounts.

In accordance with a second aspect of the present invention, the color data processing system can be used with a variety of signal formats. For example, the input signal can be formatted to represent each pixel of an image as an entry in RGB color space, and the output signal can be formatted to represent each pixel as an entry in CMYK colorant space. Alternatively, the input signal can represent pixels as entries in an HSB color model, and the output signal represents pixels as entries in CMYK colorant space. In the HSB color model, each entry comprises three values h, s, b which respectively indicate the hue H, saturation S, and brightness B of one or more pixels. Applicable signal formats according to the present invention are not limited to color and colorant spaces.

In accordance with a third aspect of the present invention, an input signal which represents a color in a pixel is processed by a substantially reversible process to generate an output signal which represents a colorant amount for such pixel. Such color may be a combination of primary colors of a color space, and the colorant may be a mixture or other combination of primary colorants of a colorant space. The color data processing system is coupled to receive the output signal, and in response thereto, to substantially reverse the substantially reversible process, in accordance with the present invention. This supplies a signal which represents a color that substantially matches the original color within limits of gamut because the substantially reversible process has been substantially reversed. This is highly beneficial for undoing improper color to colorant conversions.

In accordance with a fourth aspect of the present invention, the color data processing system receives one or more colorant amounts which inaccurately represent an original color for printing purposes. The color data processing system determines one or more color amounts which in a predetermined color space substantially match the original color within limits of gamut. This is can be achieved with color amounts which weight corresponding primary colors of a particular display device. For example, the color data processing system can be implemented to determine a plurality of color amounts (r', g', b') of an RGB color space such that r'R +g'G +b'B substantially matches the original color within limits of gamut. The color data processing system then generates a signal that indicates the value of the color amounts (r', g', b'). The signal can be used for displaying the original color or close approximation thereof on a display device. Alternatively, the signal can be processed to determine a final signal which indicates accurate colorant amounts for printing the original color with high accuracy. This beneficially allows inaccurate colorant amounts for a pixel to be converted back to corresponding color amounts for the pixel, and then to accurate colorant amounts for the pixel. The pixel can be accurately printed with such accurate colorant amounts.

In accordance with a fifth aspect of the present invention, the color data processing method of the present invention receives as input a representation of a first colorant obtained by applying a substantially reversible transformation to a representation of a first color. In response to the received representation of the first colorant, the color data processing method determines a second color which substantially matches the first color. The color data processing method then determines a second colorant which substantially matches the second color within limits of gamut. The second colorant substantially matches the first color within limits of gamut because the first color substantially matches the second color within limits of gamut, and further because the color data processing method uses an accurate transformation between colors and colorants to determine the second colorant.

The present invention is particularly beneficial where colorant amounts were determined by applying a substantially reversible process to original color amounts. By substantially reversing such process, the present invention generates corresponding color amounts that substantially match the original color amounts. It is believed that the corresponding color amounts generated by operation of the present invention will frequently be exactly identical to the original color amounts. High quality printing results are obtained in accordance with the present invention even where exact equality between the corresponding and original color amounts is not obtained. The corresponding color amounts can also be used to accurately display the original color amounts, for example, on a CRT monitor.

It is not necessary to be skilled in computer programming to operate the present invention. For example, in some embodiments of the present invention, a post processor receives inaccurate colorant amounts for a pixel from a processor, and supplies in response thereto, accurate colorant amounts for the pixel. Such a post processor can comprise a dedicated device such as a print server, or can be supplied by the processor in response to data and or software instructions. This beneficially allows continued usage of conventional color data processing software and protocols, but typically yields more accurate printing results.

The features and advantages described in the specification are not all-inclusive, and particularly, many additional features and advantages will be apparent to one of ordinary skill in the art in view of the drawings, specification, and claims thereof. Moreover, it should be noted that the language used in the specification has been selected principally for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 5 is a flow chart of a second embodiment of the color data processing method for supplying colorant space entries for printing colors accurately according to the present invention.

DETAILED DESCRIPTION OF THE INVENTION

Figure 1:
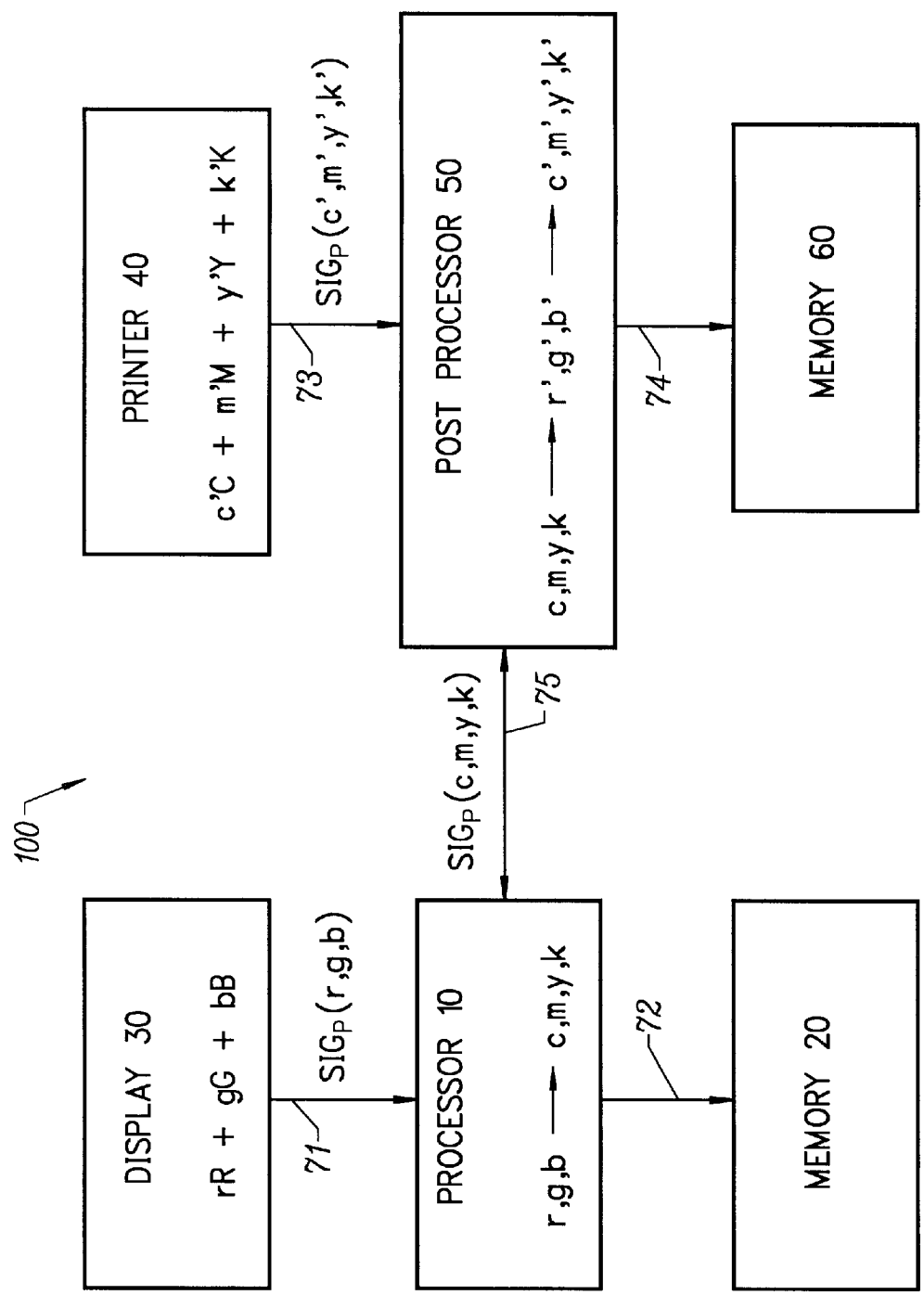
FIG. 1 is a block diagram of an embodiment of the color data processing system that receives inaccurate colorant amounts and supplies responsive thereto accurate colorant amounts according to the present invention.

Referring now to FIG. 1 there is shown a block diagram of an embodiment of a color data processing system 100 that receives inaccurate colorant amounts and responsive thereto supplies accurate colorant amounts according to the present invention. Color data processing system 100 comprises a post processor 50, a memory 60, and a bus 74, and operates in a data processing environment which includes a processor 10, memory 20, display 30, printer 40, plurality of buses 71–73, and network interconnect 75. The processor 10 is coupled by bus 71 to the display 30, and is further coupled by bus 72 to memory 20. The post processor 50 is coupled by bus 73 to the printer 40, and is further coupled by bus 74 to memory 60. The processor 10 and post processor 50 are coupled together by the network interconnect 75.

The processor 10 and post processor 50 can each be any general purpose processor such as a PENTIUM®, PENTIUM II®, or other INTEL x86® compatible central processing unit (CPU). Such INTEL x86® compatible CPU's are commercially available from INTEL CORPORATION of Santa Clara, Calif., and other manufacturers. In a preferred embodiment of the present invention, the processor 10 is an INTEL x86® compatible CPU, and the post processor 50 is a POWER PC® commercially available from APPLE COMPUTER, INC. of Cupertino, Calif.

Memory 20 and memory 60 each can be any information storage device capable of storing large amounts of information which can be read respectively by the processor 10 and post processor 50, such as a hard disk drive, compact disk (CD) drive, or digital versatile disk (DVD) drive. Preferably, memories 20, 60 are computer readable mediums respectively readable by the processor 10 and post processor 50.

The processor 10 processes data and instructions in a conventional manner to supply original color amounts (r, g, b) corresponding to each red (R), green (G), and blue (B) light of each pixel. This processing is generally done in response to software instructions and data supplied by the memory 20, and may comprise reading the memory 20 to obtain the original color amounts (r, g, b).

The display 30 is of the typical raster variety, such as a CRT monitor, and thus includes an array of pixels. Each pixel of the display includes R, G, and B color dots which respectively generate R, G, and B light. As is typical with raster displays, a separate set of original color amounts (r, g, b) controls each pixel of the display.

To illuminate a pixel, the processor 10 processes the original color amounts (r, g, b) corresponding to the pixel to generate a signal $SIG_D$(r, g, b) which controls illumination of each of the R, G, B color dots of the pixel. The signal $SIG_D$(r, g, b) encodes the original color amounts (r, g, b) for the pixel in a manner compatible with the display 30. In response to this signal $SIG_D$(r, g, b), the display 30 illuminates the R, G, and B color dots of the pixel by the respective amounts rR, gG, and bB. The pixel thus supplies light of color and intensity rR+gG+bB, where + designates that colors are combined together. Colors can be combined by mixing or closely juxtaposing their radiant flux.

The printer 40 is a color printer which receives color data as an array of pixels, with each pixel specified by amounts of conventional cyan (C), magenta (M), yellow (Y), and black (K) colorants. In some preferred embodiments of the present invention, the printer 40 comprises a XEROX 5799® color copier having a SPLASH PCI 1280® digital front end for processing color data. The XEROX 5799® color copier is commercially available from XEROX CORPORATION, of Rochester, N.Y. The SPLASH PCI 1280® digital front end is commercially available from SPLASH TECHNOLOGY, INC. of Sunnyvale, Calif. Each printed pixel typically comprises a small quantity of one more colorants or combination of colorants. Other and additional colorants may alternatively be used in printer 40 in accordance with the present invention. A set of colorant amounts (c, m, y, k) for each pixel weights respective amounts of the colorants C, M, Y, K to be included in the pixel when printed. The printer 40 may process color data to vary characteristics such as print resolution. A color dot of the display 30 may correspond, for example, to several colorant dots on a printed image, or vice versa.

To print the pixel, the processor 10 converts the original color amounts (r, g b) for the display 30 to inaccurate colorant amounts (c, m, y, k) for the printer 40. To more particularly describe the structure and operation of the present invention, the following exemplary RGB to CMYK color conversion protocol is presumed, where r, g, b, c, m, y, and k are all scaled to be between zero and one inclusive:

$k = \min\{1-r, 1-g, 1-\}b$, $c = 1-(r+k)$, $m = 1-(g+k)$, and $y = 1-(b+k)$.

The inaccurate colorant amounts (c, m, y, k) determined by this conversion protocol sometimes are too high. Nonetheless, this and other substantially similar conversion protocols are in common use. For example, the exemplary RGB to CMYK color conversion protocol is essentially equivalent to the POSTSCRIPT® LEVEL 1 conversion protocol. In some software products, such as CORELDRAW®, such RGB to CMYK color data conversions sometimes cannot be disabled.

Upon converting color amounts (r, g, b) to inaccurate colorant amounts (c, m, y, k), the processor 10 supplies a signal $SIG_p$ (c, m, y, k) which encodes the inaccurate colorant amounts (c, m, y, k) in a manner compatible with the printer 40. This signal $SIG_p$(c, m, y, k) is then asserted by the processor 10 onto the network interconnect 75. If network interconnect 75 were coupled directly to the printer 40, this signal $SIG_p$(c, m, y, k) would directly control printing of the pixel, and the pixel would be supplied with a combination of colorants cC+mM+yY+kK. The inaccurate colorant amounts (c, m, y, k) determined under the exemplary conversion protocol sometimes are too high, and thus the results of the exemplary RGB to CMYK color conversion sometimes would be too gray and too dark.

Color data processing system 100 avoids this limitation of conventional color data processing by converting the inaccurate colorant amounts (c, m, y, k) to accurate colorant amounts (c', m', y', k') as follows. The post processor 50 receives the signal $SIG_P$(c, m, y, k) on network interconnect 75, and decodes therefrom the inaccurate colorant amounts (c, m, y, k) for a pixel. The post processor 50 then determines corresponding colors amounts (r', g', b') such that r'R +g'B +b'B substantially matches rR+gG+bB. The post processor 50 uses an accurate conversion from RGB color space to CMYK colorant space read from memory 60 to convert the corresponding color amounts (r', g', b') to accurate colorant amounts (c', m', y', k') for the pixel. Finally, the post processor 50 encodes the accurate colorant amounts (c', m', y', k') in signal $SIG_P$ (c', m', y', k'), and supplies the signal $SIG_P$ (c', m', y', k') via bus 73 to the printer 40. In response to this signal $SIG_P$ (c', m', y', k'), the printer 40 accurately prints the pixel as c'C+m'M+y'Y+k'K. Due to operation of the present invention, the pixel printed c'C+m'M+y'Y+k'K substantially matches within limits of gamut the color rR+bB+gG associated with the color amounts (r, g, b) for the pixel. To print a block of color data, the post processor 50 repeats this operation for each pixel of color data.

Obtaining an appropriate conversion between inaccurate colorant amounts (c, m, y, k) and corresponding color amounts (r', g', b') is believed to depend on the particular conversion used by the processor 10 to convert the original color amounts (r, g, b) to inaccurate colorant amounts (c, m, y, k). For example, the exemplary RGB to CMYK color conversion given above is reversible, and thus r', g'and b'can be determined as:

r'=1−(c+k), b'=1−(y+k), and g'=1−(m+k).

When this is determined precisely, r'=r, g'=g, and b'=b. However, such exact equality between the original color amounts (r, g, b) and the corresponding color amounts (r', g', b') typically is not required for substantially improved processing of color data. In practice the corresponding color amounts (r', g', b') may differ from the original color amounts (r, g, b). For example, the above conversion to the corresponding color amounts (r', g', b') involves arithmetic operations, which may yield insubstantial rounding or truncation errors. Nonetheless, color data processing system 100 supplies corresponding color amounts (r', g', b') which are believed to be substantially equal to the original color amounts (r, g, b), and that exact equality frequently will be obtained between the corresponding color amounts (r', g', b') and the original color amounts (r, g, b).

Some conventional color to colorant conversions are substantially reversible, but not entirely reversible. However, it is usually possible to convert the inaccurate colorant amounts (c, m, y, k) determined by such processes to corresponding color amounts (r', g', b'), and then convert these corresponding color amounts (r', g', b') to accurate colorant amounts (c', m', y', k') for accurately printing pixels, in accordance with the present invention.

To convert from inaccurate colorant amounts (c, m, y, k) to corresponding color amounts (r', g', b'), the memory 60 of color data processing system 100 stores a predetermined conversion from CMYK colorant space to RGB color space. The post processor 50 reads this conversion from memory 60 and responsive thereto converts the inaccurate colorant amounts (c, m, y, k,) to the corresponding color amounts (r', g', b'). The memory 60 also stores a predetermined conversion from RGB color space to CMYK colorant space. The post processor 50 reads this second conversion and responsive thereto converts the corresponding color amounts (r', g', b') to accurate colorant amounts (c', m', y', k').

In color data processing system 100, post processing of colorant amounts (c, m, y, k) is accomplished with post processor 50. In alternative embodiments of the present invention, post processing of colorant amounts is achieved by the processor 10 in response to the information stored in the memory 60. Similarly, the information stored in the memory 60 can alternatively be stored in the memory 20, with post processing of colorant amounts performed either by the post processor 50 or the processor 10. The CMYK colorant space can be replaced by an alternative color or colorant space in accordance with the present invention.

Figure 2:
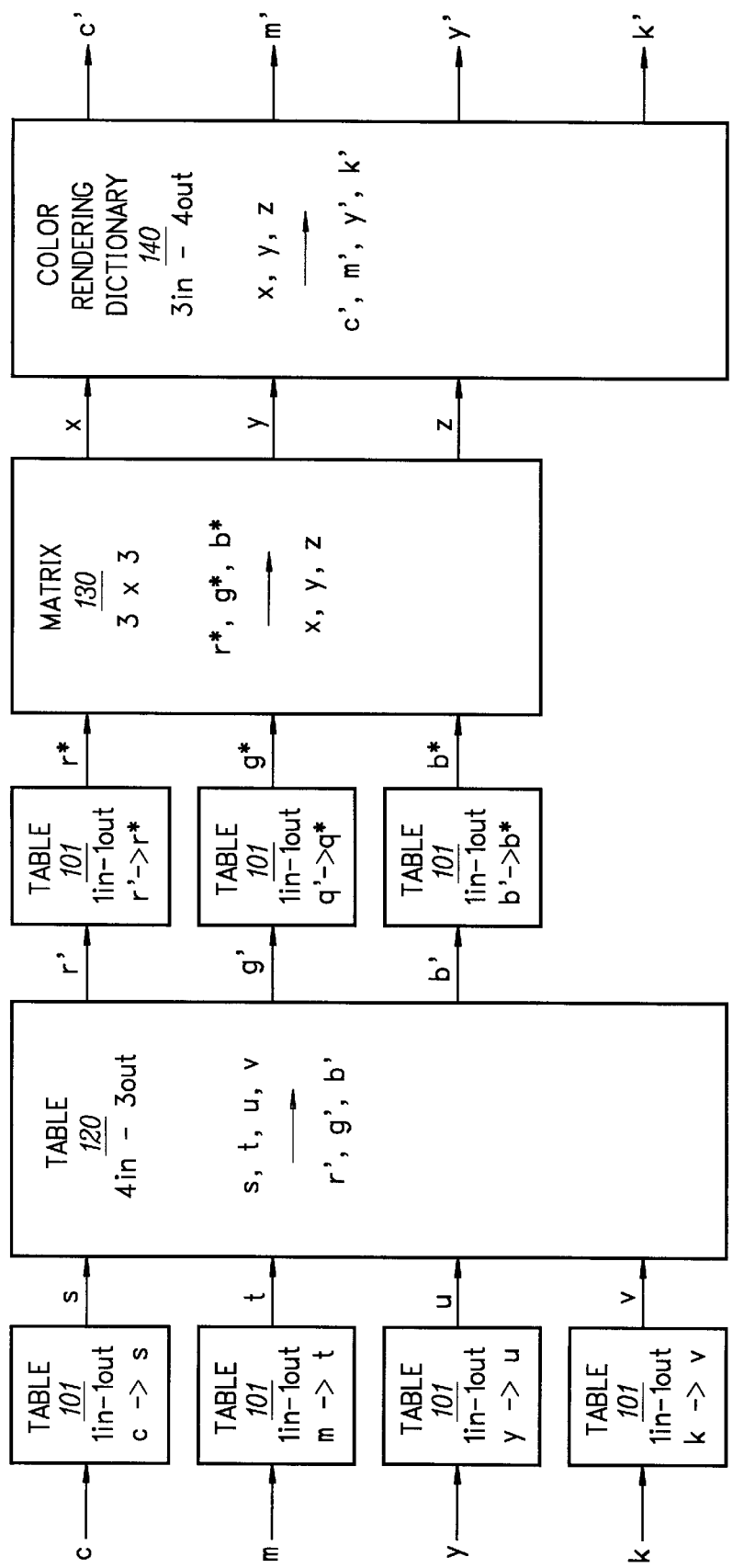
FIG. 2 is a block diagram of an embodiment of a color data processing data structure that receives inaccurate colorant amounts and supplies responsive thereto accurate colorant amounts according to the present invention.

Referring now to FIG. 2 there is shown a block diagram of an embodiment of a color data processing data structure 200 that receives inaccurate colorant amounts and supplies responsive thereto accurate colorant amounts according to the present invention. Color data processing data structure 200 comprises a plurality of tables 101–107, 120, a matrix 130, and a color rendering dictionary 140. Color data processing data structure 200 further includes a plurality of software instructions capable of directing a processor, such as processor 10 or post processor 50, to use the various tables 101–107, 120, matrix 130, and color rendering dictionary 140 for converting the original colorant amounts to the accurate colorant amounts. Color data processing data structure 200 is capable of directing the post processor 50 to perform the color data processing method of the present invention. Preferably, the color data processing data structure is stored in memory 60, and the post processor 50 preferably reads the memory 60 to obtain the color data processing data structure 200, and responsive thereto, performs the color data processing method according to the present invention. Preferably, the color data processing data structure 200 is defined using POSTSCRIPT 3®, which is commercially available from ADOBE SYSTEMS, INCORPORATED.

In response to the software instructions, post processor 50 operatively couples tables 101–107, 120, and matrix 130, and color rendering dictionary 140 as follows. Tables 101–104 are operatively coupled to receive decoded input from the processor 50, and to supply input to table 120. Table 120 is operatively coupled supply input to tables 105–107. Tables 105–107 are operatively coupled supply input to matrix 130, and matrix 130 is operatively coupled to supply input to color rendering dictionary 140. Finally, color rendering dictionary 140 supplies output colorant amounts. The output colorant amounts are then encoded and sent to the printer 40. When implemented physically by the post processor 50 and memory 60, the various inputs and outputs are supplied as voltage level signals.

Tables 101–104 each accepts a one dimensional input and supplies a one dimensional output (1 in- 1 out). The tables 101–104 each store a conversion of colorant amounts (c, m, y, k) in the CMYK colorant space of the printer 40 to colorant amounts (s, t, u, v) of a virtual STUV colorant space. More particularly, table 101 converts colorant amount c to colorant amounts, table 102 converts colorant amount m to colorant amount t, table 103 converts colorant amount y to colorant amount u, and table 101 converts colorant amount k to colorant amount v. These are identity conversions in default mode. The conversions may be redefined by the user if desired to modify characteristics of color conversion. Tables 101–104 can beneficially be defined and operated using commercially available color data processing protocols, such as POSTSCRIPT 3®, where D, E. F, and G respectively represent C, M, Y, and K.

Table 120 accepts a four dimensional input and supplies a three dimensional output (4in - 3out). Table 120 stores a conversion of colorant amounts (s, t, u, v) in virtual STUV colorant space to corresponding color amounts (r', g', b') in the RGB color space of the display 30. This conversion substantially reverses the conversion of the original color amounts (r, g, b) to inaccurate colorant amounts (c, m, y, k) performed by processor 10. Accordingly, the color r'R+g'G+b'B associated with corresponding color amounts (r', g', b') substantially matches the color rR+gG+bB associated with the original color amounts (r, g, b). Table 120 can beneficially be defined and operated using commercially available color data processing protocols, such as POSTSCRIPT 3®.

Each of tables 105–107 accepts a one dimensional input, supplies a one dimensional output (1in - 1out). The tables 105–107 comprise a conversion of corresponding color amounts (r', g', b') in the RGB color space of the display 30 to reference color amounts (r*, g*, b*) in a reference R*G*B* color space. The reference R*G*B* color space is gamma γ independent. For a CRT monitor, for example, the conversion typically is equivalent to:

$r^* = (r'/255)^\gamma$;
$g^* = (g'/255)^\gamma$; and
$b^* = (b'/255)^\gamma$;

where γ is the gamma γ value to which the color amounts (r, g, b) would be raised in the monitor, and where the divisor 255 comprises a scaling present in the color amounts (r, g, b). In this embodiment of the present invention, r*, g*, and b* are each determined by reading tables 105, 106, and 107 respectively, rather than by performing division and exponentiation operations in the post processor 50.

Matrix 130 is a 3×3 matrix. It accepts three dimensional inputs and supplies three dimensional outputs. Matrix 130 comprises the conversion of reference color amounts (r*, g*, b*) in the reference R*G*B* color space to color amounts (x, y, z) in the CIE based XYZ color space defined by the Commission International de l' Énclairage (CIE) in 1931. It may be written as $$Matrix\ 130 = \begin{bmatrix} X_R & Y_R & Z_R \\ X_G & Y_G & Z_G \\ X_B & Y_B & Z_B \end{bmatrix},$$

with the conversion from (r*, g*, b*) to (x, y, z) given as $$(x, y, z) = (r^*, g^*, b^*) \begin{bmatrix} X_R & Y_R & Z_R \\ X_G & Y_G & Z_G \\ X_B & Y_B & Z_B \end{bmatrix}.$$

The matrix 130 determines color amounts x, y, z≧0 such that xX+yY+zZ substantially matches r*R+g*G+b*B. Unlike a table, the matrix 130 operates by matrix multiplication. It is noted that the entry values of matrix 130 depend in conventional manner on characteristics of the reference R*G*B* color space. Matrix multiplication for 3×3 matrices is supported by many commercially available color data processing protocols, including POSTSCRIPT 3®.

Finally, color rendering dictionary 140 accepts three dimensional input and supplies four dimensional output (3in -4out). The color rendering dictionary 140 stores a conversion of color amounts (x, y, z) in the CIE based XYZ color space to accurate colorant amounts in (c', m', y', k') in the CMYK colorant space of the printer 40. The CIE based XYZ color space is as defined by CIE in 1931. A conventional color rendering dictionary more accurate than the POSTSCRIPT® LEVEL 1 RGB to CMYK conversion protocol may be used to convert from XYZ color space to CMYK colorant space. Such a conventional color rendering dictionary is included, for example, in POSTSCRIPT 3®. In a preferred embodiment of the present invention, the color rendering dictionary 140 is that shown in FIG. 4. Also included below is source code and various tables for implementing such color rendering dictionary 140 in POSTSCRIPT 3® in accordance with the present invention.

The post processor 50, memory 60, operate with tables 101–104, 120 to form a first subsystem which receives the inaccurate colorant amounts (c, m, y, k) from processor 10, and supplies, in response thereto, the corresponding color amounts (r', g', b') which comprise a substantial recovery of the original amounts (r, g, b). The post processor 50, memory 60, further operate with tables 105–107, matrix 130, and color rendering dictionary 140 to form a second subsystem, operatively coupled with the first subsystem, which receives the corresponding color amounts (r', g', b'), and supplies, in response thereto, the accurate colorant amounts (c', m', y', k'). When so operated, the accurate colorant amounts (c', m', y', k') accurately represent both the corresponding color amounts (r', g', b'), and the original color amounts (r, g, b) for printing purposes.

Figure 3:
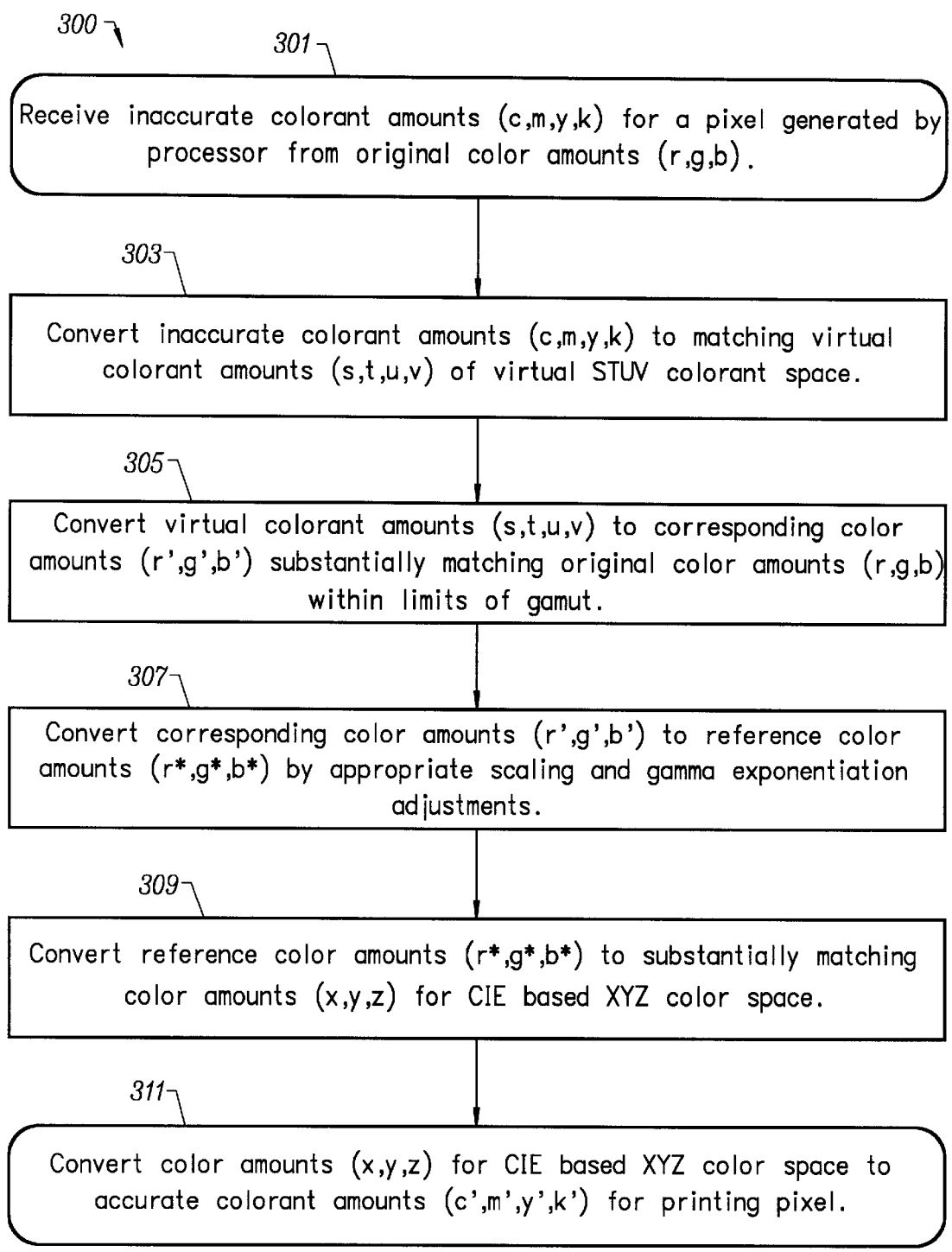
FIG. 3 is a flow chart of a first embodiment of the color data processing method that receives inaccurate colorant amounts and supplies responsive thereto accurate colorant amounts according to the present invention.

Referring now to FIG. 3, there is shown a flow chart of a first embodiment of the color data processing method 300 of the present invention which can be performed, for example, using the color data processing data structure 200 with the color data processing system 100. Prior to operation of color data processing method 300, original color amounts (r, g, b) suitable for illuminating a pixel of the display 30 are converted by the processor 10 to inaccurate colorant amounts (c, m, y, k) for printing the pixel on the printer 40.

In step 301, the inaccurate colorant amounts (c, m, y, k) for a pixel are received by the post processor 50. In response to the DecodeDEFG command received from memory 60, post processor 50 then invokes tables 101–104 to convert 303 the inaccurate colorant amounts (c, m, y, k) to virtual colorant amounts (s, t, u, v) in a virtual STUV colorant space. The post processor 50 uses the 4 in - 3 out table 120 to convert 305 the virtual colorant amounts (s, t, u, v) to corresponding color amounts (r', g', b') which substantially match the original color amounts (r, g, b). In this embodiment of the present invention, the corresponding color amounts (r', g', b') are in the same RGB color space as the original color amounts (r, g, b), and r'R+g'G+b'B substantially matches rR+gG+bB.

In step 307, the post processor 50 uses 1 in - 1 out tables 105–107 to convert the corresponding color amounts (r', g', b') to reference color amounts (r*, g*, b*) in a reference R*G*B* color space that does not reflect attributes of the display 30. The post processor 50 then uses the 3×3 matrix 130 to convert 309 reference color amounts (r*, g*, b*) to color amounts (x, y, z) in the CIE based XYZ color space, as this XYZ color space was defined by CIE in 1931. This conversion to CIE based XYZ color space will be immediately understood by those skilled in the art. Finally, the processor 50 uses the 3 in - 4 out color rendering dictionary 140 to convert the color amounts (x, y, z) into accurate colorant amounts (c', m', y', kl) for printing the pixel accurately within limits of gamut.

Figure 4:
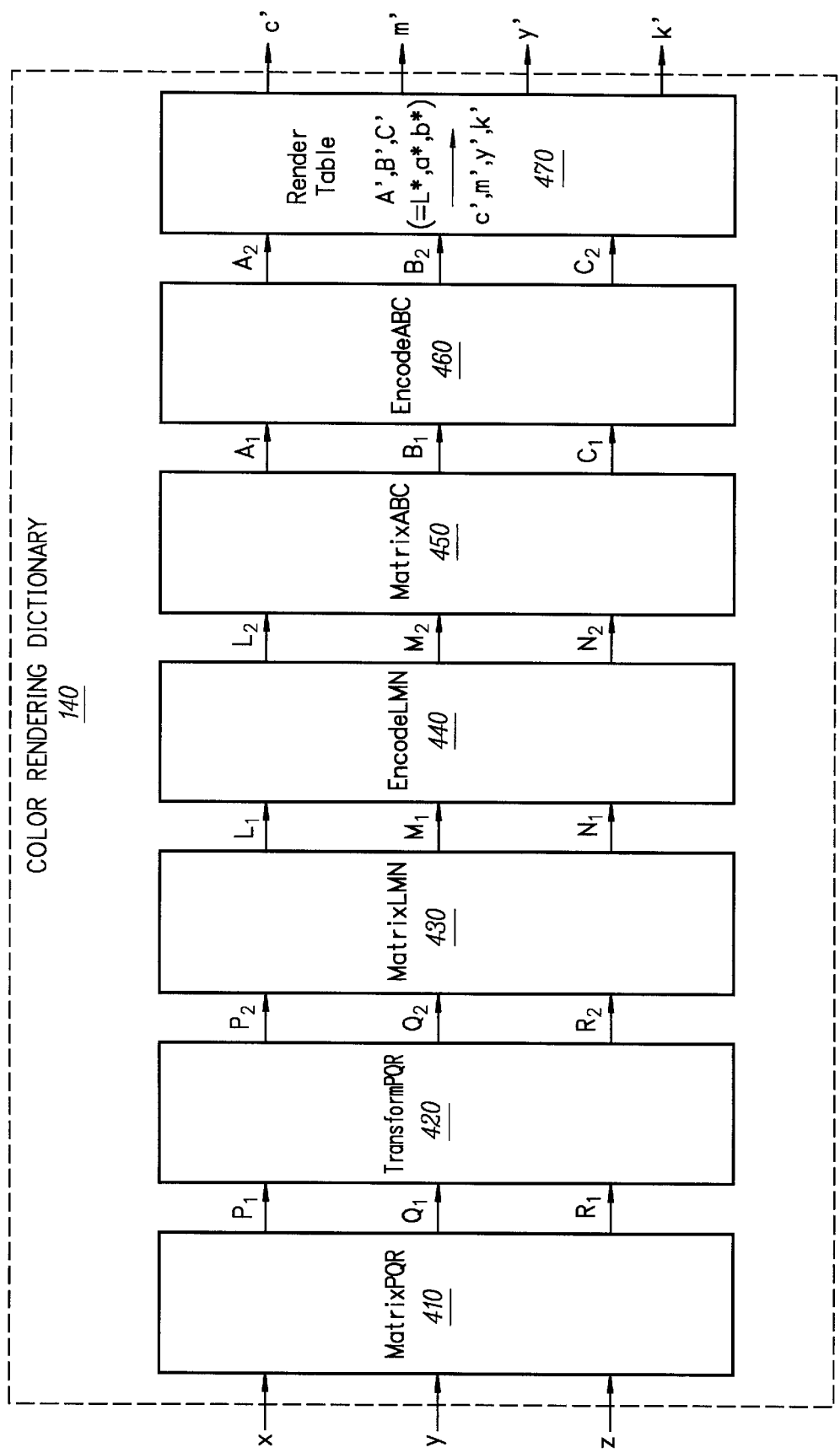
FIG. 4 is a block diagram illustrating an embodiment of a color rendering dictionary that receives color amounts from a CIE based XYZ color space and supplies responsive thereto accurate colorant amounts in a CMYK colorant space according to the present invention.

Referring now to FIG. 4, there is shown a block diagram of an embodiment of the color rendering dictionary 140 that receives color amounts (x, y, z) from a CIE based XYZ color space, and supplies, responsive thereto, accurate colorant amounts (c', m', y', k') in a CMYK colorant space according to the present invention. For this embodiment of the color rendering dictionary 140, the printer 40 preferably comprises a XEROX 5799® color copier having a SPLASH PCI 1280® digital front end for processing color data. This embodiment of the color rendering dictionary 140 is defined using POSTSCRIPT 3® commands and data structures compatible therewith. The full POSTSCRIPT 3® source code and corresponding data structures for this embodiment of the color rendering dictionary 140 is included below before the claims.

The data structures include a plurality of matrices 410, 430, 450 and a table 470. The commands include in the order applied MatrixPQR 410, Transform PQR 420, MatrixLMN 430, EncodeLMN 440, MatrixABC 450, and EncodeABC 460, which together transform received XYZ color data to L*a*b* color data. The commands also include Render Table 470 which transforms L*a*b* color data to CMYK colorant data. To improve clarity of presentation, data structures 410, 430, 450, 470 are further referenced by the commands Matrix 410, Matrix LMN 430, Matrix 450, and Render Table 470 which respectively apply the data structures 410, 430, 450, 470 to the data being processed.

It is noted that subscripts are shown on vector variables below (and in FIG. 4) merely to distinguish between variables having the same variable name. It is further noted that various variables P, Q, R, L, M, N, A, B, C, L*, a*, b* (which may be shown with subscripts) internal to this embodiment of the color rendering dictionary 140 should not be confused with items, such as red R, used elsewhere the application and similarly named.

MatrixPQR 410 and MatrixLMN 430 are 3×3 identity matrices. They merely effect a change in variable names. Thus, in response to receiving row vector (x, y, z), MatrixPQR 410 outputs row vector $(P_1, Q_1, R_1)$ with $P_1=x$, $Q_1=y$, and $R_1=z$. Further, in response to receiving row vector $(P_2, Q_2, R_2)$, Matrix 430 outputs row vector $(L_1, M_1, N_1)$ with $L_1=P_2$, $M_1=Q_2$, and $N_1=R_2$.

TransformPQR 420 converts the WhitePoint of input data to the WhitePoint of output data. WhitePoint comprises a characterization of the whitest color in a color model. In the color spaces used in this embodiment of the present invention, the WhitePoint is characterized as the largest color amounts in the color space. These are referenced herein using a "w" subscript. For example, for the CIE based XYZ color space data received at the input of color rendering dictionary 140, the largest color amounts are written as $(X_w, Y_w, Z_w)$.

In response to receiving row vector $(P_1, Q_1, R_1)$, TransformPQR 420 outputs row vector $(P_2, Q_2, R_2)$ where:

$P_2=P_{2w} \times (P_1/X_w)$,
$Q_2=Q_{2w} \times (Q_1/Y_w)$, and
$R_2=R_{2w} \times (R_1/Z_w)$.

TransformPQR 420 changes WhitePoint to $P_{2w}$, $Q_{2w}$, $R_{2W}$ which preferably is the whitest color reflected from a print medium, such as white paper, under desired lighting conditions. TransformPQR 420 thus preferably converts white in source XYZ color space to white for the destination CMYK colorant space under such lighting conditions.

EncodeLMN 440 converts input row vector $(L_1, M_1, N_1)$ to a row vector $(L_2, M_2, N_2)$. Usually, $L_2$, $M_2$, $N_2$ are respectively determined as $L_2=(L_1/P_{2w})^{1/3}$, $M_2=(M_1/Q_{2w})^{1/3}$, and $N_2=(N_1/R_{2w})^{1/3}$. However, if $L_1$ is less than or equal to 0.008856, then $L_2$ is determined as $L_2=7.787 \times (L_1/P_{2w})+16/116$. Similarly, if $M_1$ is less than or equal to 0.008856, then $M_2$ is determined as $M_2=7.787 \times (M_1/Q_{2w})+16/116$. Similarly, if $N_1$ is less than or equal to 0.008856, then $N_2$ is determined as $N_2=7.787 \times (N_1/R_{2w})+16/116$. Thus, if $L_1$ and $N_1$ are greater than 0.008856, but $M_1$ is less than 0.008856, then $L_2$, $M_2$, $N_2$ are determined as:

$L_2=(L_1/P_{2w})^{1/3}$,
$M_2=7.787 \times (M_1/Q_{2w})+16/116$, and
$N_2=(N_1/R_{2w})^{1/3}$.

MatrixABC 450 converts input row vector $(L_2, M_2, N_2)$ to a row vector $(A_1, B_1, C_1)$ where $A_1$, $B_1$, $C_1$ are determined as:

$A_1=M_2$,
$B_1=L_2-M_2$, and
$C_1=M_2-N_2$.

EncodeABC 460 converts input row vector $(A_1, B_1, C_1)$ to a row vector $(A_2, B_2, C_2)$ where $A_2$, $B_2$, $C_2$ are determined as:

$A_2=116 \times A_1-16$,
$B_2 500 \times B_1$, and
$C_2=200 \times C_1$.

Finally, Render Table 470 effects a conversion from color space L*a*b* to CMYK colorant space which is believed to be ideal in accordance with the present invention. Any desired conversion from L*a*b* color space to CMYK colorant space may be used here. In accordance with the present invention, such conversion should preferably provide a more accurate transformation from color to colorant space than the exemplary RGB to CMYK color conversion protocol shown above with reference to FIG. 1 and essentially achieved by POSTSCRIPT® LEVEL 1. A preferred embodiment of Render Table 470 for this embodiment of color rendering dictionary 140 is included below together with source code for implementing the Render Table 470 and color rendering dictionary 140 in the POSTSCRIPT 3® programming language.

In operation, CIE based XYZ color amounts (x, y, z) are supplied to MatrixPQR 410. MatrixPQR 410 outputs $(P_1, Q_1, R_1,)=(x, y, z)$, merely effecting a change in variable names. TransformPQR 420 receives $(P_1, Q_1, R_1)$ and outputs $(P_2, Q_2, R_2)$, where:

$P_2=P_{2w} \times (P_1/X_w)$,
$Q_2=Q_{2w} \times (Q_1/Y_w)$ and
$R_2=R_{2w} \times (R_1/Z_w)$.

MatrixLMN 430 then applies the identity transformation to change variable names to $(L_1, M_1, N_1)$ where $L_1=P_2$, $M_1=Q_2$, and $N_1=R_2$. EncodeLMN 440 converts $(L_1, M_1, N_1)$ to $(L_2, M_2, N_2)$. Usually $L_2$, $M_2$, $N_2$ are determined as:

$L_2=(L_1/P_{2w})^{1/3}=(x/X_w)^{1/3}$,
$M_2=(M_1/Q_{2w})^{1/3}=(y/Y_w)^{1/3}$, and
$N_2=(N_1/R_{2w})^{1/3}=(z/Z_w)^{1/3}$.

However, if $L_1$ is less than or equal to 0.008856, then $L_2$ is determined as $L_2 \times 7.787 \times (L_1/P_{2w})+16/116=7.787=(x/X_w)+16/116$. Similarly, if $M_1$ is less than or equal to 0.008856, then $M_2$ is determined as $M_2=7.787 \times (M_1/Q_{2w})+16/116=7.787 \times (y/Y_w)+16/116$. Similarly, if $N_1$ is less than or equal to 0.008856, then $N_2$ is determined as $N_2=7.787 \times (N_1/R_{2w})+16/116=7.787 \times (z/Z_w)+16/116$. Thus, if $N_1$ is less than 0.008856 and $L_1$ and $M_2$ are both greater than 0.008856, then $L_2$, $M_2$, $N_2$ are determined as:

$L_2=(L_1/P_{2w})^{1/3}=(x/X_w)^{1/3}$,
$M_2=(M_1/Q_{2w})^{1/3}=(y/Y_w)^{1/3}$, and
$N_2=7.787 \times (N_1/R_{2w})+16/116=7.787 \times (z/Z_w)+16/116$.

The net effect of these operations is to scale received XYZ color data and normalize WhitePoint to (1, 1, 1).

MatrixABC 450 and EncodeABC 460 are sequentially applied to the output ($L_2$, $M_2$, $N_2$) to yield ($A_2$, $B_2$, $C_2$)=($L^*$, $a^*$, $b^*$) color amounts corresponding to the (x, y, z) color amounts received at the input of the color rendering dictionary 140. For example, where $L_1$, $M_1$, $N_1$ are all greater than 0.008856, $L^*$, $a^*$, $b^*$ are given as:

$L^* = 116 \times (y/Y_w)^{1/3} - 16$,
$a^* = 500 \times [(x/X_w)^{1/3} - (y/Y_w)^{1/3}]$, and
$b^* = 200 \times [(y/Y_w)^{1/3} - (z/Z_w)^{1/3}]$.

The determined row vector ($L^*$, $a^*$, $b^*$) is then input to the Render Table 470 to determine colorant amounts (c', m', y', k') substantially matching color amounts (x, y, k) within limits of gamut.

A preferred embodiment of the Render Table 470 is shown below, before the claims, together with computer source code for implementing the color rendering dictionary 140 in the POSTSCRIPT 3® computer programming language. This Render Table 470 can alternatively be used for implementing the color rendering dictionary 140 in other programming languages and by other means, as will be apparent to those skilled in the art.

$L^*$, $a^*$, and $b^*$ are indexed to this embodiment of the Render Table 470 as follows. $L^*$ has values in a range from 0 to 100. These values start at $L^*=0$ and are separated by 100/32=3.125. Thus, the first three $L^*$ values are 0, 3.125, and 6.250. Further, $a^*$ has values from −128 to 128. These values start at $a^*=-128$ and are separated by 256/32=8. Thus, the first three $a^*$ values are −128, −120, and −112. Similarly, $b^*$ has values from −128 to 128. These values start at $b^*=-128$ and are separated by 256/32 =8. Thus, the first three $b^*$ values are −128, −120, and −112.

In the Render Table 470 shown below, each set of 33 rows contained within braces <33 rows > corresponds to a particular $L^*$ value. Each row is printed left to right on four successive lines of the printed page. The first, second, and third lines of the row respectively wrap around to the second, third, and fourth lines of the row in conventional manner. Blank space is included between the rows to improve readability of the Render Table 470. The $L^*$ values start at $L^*=0$, and increase by 3.125 in each successive set of 33 rows. Within each set of 33 rows, each row corresponds to a particular $a^*$ value, with $a^*=-128$ in the first row of the set, $a^*=-120$ in the second row of the set, and $a^*$ increasing by 8 in each successive row of the set of 33 rows. Within each row, $b^*$ ranges from −128 to 128, with the first eight hexadecimal digits of a row corresponding $b^*=-128$, the next eight hexadecimal digits of the row corresponding to $b^*=-120$, and with $b^*$ increasing by 8 in each successive set of eight hexadecimal digits of the row.

The entry corresponding to ($L^*$, $a^*$, $b^*$)=(3.125, −112, −120) is thus stored in the ninth through sixteenth hexadecimal digits of the third row of the second set of 33 rows of the Render Table 470. These are given FF0000DF=c'm'y'k'. Each two successive hexadecimal digits gives one of the accurate colorant amounts. Thus, if ($L^*$, $a^*$, $b^*$)=(3.125, −112, −120), then (c', m', y', k')=(FF, 00, 00, DF). Each pair of hexadecimal digits, corresponds to the amount of colorant of colorant relative to a maximum that should be used to print a pixel. The hexadecimal is in standard unsigned format. Thus if the maximum amount of black(K) is $K_{max}$, then for k'=DF, (KMx×DF/FF ) amount of black (K) colorant should be used. In POSTSCRIPT®, the maximum amounts $C_{max}$, $Y_{max}$, $K_{max}$ respectively of C, M, Y, K colorants are each equal to one. That is $C_{max} = M_{max} = Y_{max} = K_{max} = 1$ in POSTSCRIPT®.

Referring now to FIG. 5, there is shown a flow chart of a second embodiment of the color data processing method 500 for supplying colorant space entries for printing colors accurately according to the present invention. Prior to operation of the method, a color COLOR_1 is matched, possibly inaccurately, to a first COLORANT_1. The first colorant COLORANT_1 could comprise, for example, a particular concentration of a single colorant of a first colorant space, or a particular combination of such colorants. In step 501, in response to colorant COLORANT_2, a second color COLOR_2 is determined which substantially matches the first color COLOR_1 within limits of gamut. Preferably, the second color COLOR_2 is exactly identical to the first color COLOR_1, but substantial matches, such as metamers, typically suffice for printing the image accurately. In step 503, the second color COLOR_2 is substantially matched to a second colorant COLORANT_2 within limits of gamut. The second colorant COLORANT_2 could comprise, for example, another particular concentration of a primary colorant of a second colorant space, or a particular combination of such primary colorants. This second colorant space can be the same as the first colorant space if desired.

It is noted that the various embodiments of the present invention can accurately process input accurate colorant amounts in the same manner as input inaccurate colorant amounts. For example, a portion of RGB color space data is accurately converted by the exemplary RGB to CMYK color conversion protocol given above, and can be inverted and reconverted to accurate CMYK colorant space data by operation of the present invention.

This application contains microfiche appendix consisting of two(2) slides and 110 frames. Shown in the microfiche appendix is the above referenced computer source code for implementing a preferred embodiment of the color rendering dictionary 140 in POSTSCRIPT 3®. The source code includes the above referenced preferred embodiment of the render table 470.

What is claimed is:

1. A system for processing an output signal, the output signal produced from an input signal using a substantially reversible process, the input signal indicating a first color, said system coupled to receive the output signal, and in response thereto, to substantially reverse the substantially reversible process for supplying third signal which indicates a second color that substantially matches the first color, wherein the system determines at least one color amount which in a predetermined color space substantially matches the first color, and encodes said at least one color amount in the third signal to indicate the second color.

2. A system for processing an output signal, the output signal produced from an input signal using a substantially reversible process, the input signal indicating a first color, said system coupled to receive the output signal, and in response thereto, to substantially reverse the substantially reversible process for supplying third signal which indicates a second color that substantially matches the first color, wherein the system determines a plurality of color amounts which when weighted against a corresponding plurality of primary colors substantially matches the first color, and wherein the system encodes said plurality of color amounts in the third signal to indicate the second color.

3. A system for processing an output signal, the output signal produced from an input signal using a substantially reversible process, the input signal indicating a first color, said system coupled to receive the output signal, and in response thereto, to substantially reverse the substantially reversible process for supplying third signal which indicates a second color that substantially matches the first color, wherein the system determines a plurality of color amounts (r', g', b') of an R, G, B color space such that r'R+g'G+b'B substantially matches the first color, and wherein the system encodes said plurality of color amounts in the third signal to indicate the second color.

4. A system for processing an output signal, the output signal produced from an input signal using a substantially reversible process, the input signal indicating a first color, said system comprising:
   a first subsystem coupled to receive the output signal, the first subsystem supplying, in response to the output signal, an intermediate signal, the intermediate signal indicating a second color which substantially matches the first color; and
   a second subsystem coupled with the first subsystem for receiving the intermediate signal, the second subsystem supplying, in response to the intermediate signal, a final signal which indicates a second colorant which accurately represents the first color.

5. The system of claim 4, wherein the first subsystem substantially reverses the substantially reversible process to determine the second color.

6. The system of claim 4, wherein the first subsystem determines at least one color amount which in a predetermined color space substantially matches the first color, and encodes said at least one color amount in the intermediate signal to indicate the second color.

7. The system of claim 6, wherein the second subsystem decodes said at least one color amount from the intermediate signal, and determines the second colorant in response to said at least one color amount.

8. The system of claim 5, wherein the first subsystem determines a plurality of color amounts which when weighted against a corresponding plurality of primary colors substantially matches the first color, and wherein the first subsystem encodes said plurality of color amounts in the intermediate signal to indicate the second color.

9. The system of claim 8, wherein the second subsystem decodes said plurality of color amounts from the intermediate signal, and determines the second colorant in response to said plurality of one color amounts.

10. The system of claim 4, wherein the first subsystem determines a plurality of color amounts (r', g', b') of an R, G, B color space such that r'R+g'G+b'B substantially matches the first color, and wherein the first subsystem encodes said plurality of color amounts in the intermediate signal to indicate the second color.

11. The system of claim 10, wherein the second subsystem decodes said plurality of color amounts (r', g', b') from the intermediate signal, and determines the second colorant in response to said plurality of color amounts (r', g', b').

12. The system of claim 4, wherein the first subsystem determines the first color in response to the output signal, and encodes the first color in the intermediate signal to indicate the second color.

13. A system for processing an output signal, the output signal produced from an input signal according to a first signal processing protocol, the input signal having a first format and the output signal having a second format, the system comprising:
   a first signal processing subsystem accepting as input the output signal and producing therefrom, according to a second signal processing protocol, an intermediate signal having the first format, the second signal processing protocol substantially comprising an inversion of the first signal processing protocol; and
   a second signal processing subsystem accepting as input the intermediate signal and producing therefrom, according to a third signal processing protocol, a final signal having the second format.

14. The system of claim 13, wherein the input signal describes an image according to the first format, the output signal describes said image according to the second format, and the first signal processing subsystem produces the intermediate signal according to the second signal processing protocol to substantially match the image as described by the input signal.

15. The system of claim 13, wherein the input signal describes an image by representing an entry in a color space, the output signal describes said image by representing an entry in a colorant space, and the first signal processing subsystem produces the intermediate signal according to the second signal processing protocol to substantially match the image as described by the input signal.

16. The system of claim 13, wherein the first format comprises a color space, the second format comprises a colorant space, and wherein the input signal describes an image by representing an entry in said color space, the output signal describes said image by representing an entry in said colorant space, and the first signal processing subsystem produces the intermediate signal according to the second signal processing protocol to substantially match the image as described by the entry in said color space represented by the input signal with said image as described an entry in said color space represented by the intermediate signal.

17. A method for processing colorants, said method accepting as input a first colorant determined to correspond to a first color under a substantially reversible transformation, said method comprising the steps of:
   a) determining, in response to the first colorant, a second color which substantially matches the first color, and b) determining, in response to the second color, a second colorant which substantially matches the second color, and producing a colorant which substantially matches the first color.

18. The method of claim 17, wherein step a) further comprises the substeps of:
   1) receiving at least one colorant amount which describes the first colorant in a first colorant space; and
   2) determining, in response to said at least one colorant amount, at least one color amount which substantially matches said first color in the first color space.

19. The method of claim 17, wherein step a) further comprises the substeps of:
   1) receiving a sequence of colorant amounts which describes the first colorant as a weighting of primary colorants of a first colorant space; and
   2) determining, in response to said sequence of colorant amounts, a sequence of color amounts which substantially matches said first color by weighting primary colors of the first color space.

20. A data structure embodied in a tangible medium, said tangible medium capable of being read by a computer, said data structure capable of directing the computer system to perform the method of claim 19.

21. The method of claim 17, wherein step b) further comprises the substeps of:
   1) receiving at least one color amount which substantially matches said first color in a first color space; and
   2) determining, in response to said at least one color amount, at least one colorant amount which substantially matches said first color in a second colorant space.

22. The method of claim 21, wherein the second colorant space is substantially identical to the first colorant space.

23. The method of claim 17, wherein step b) further comprises the substeps of:
   i) receiving a sequence of color amounts which substantially matches said first color by weighting primary colors of a first color space; and
   ii) determining, in response to said sequence of color amounts, a second sequence of colorant amounts which substantially matches in a second colorant space said weighting of primary colors of the first color space.

24. The method of claim 23, wherein the second colorant space is substantially identical to the first colorant space.

25. A data structure embodied in a tangible medium, said tangible medium capable of being read by a computer, said data structure capable of directing the computer system to perform the method of claim 23.

26. A data structure embodied in a tangible medium, said tangible medium capable of being read by a computer, said data structure capable of directing the computer system to perform the method of claim 17.

27. A computer readable medium having contents which cause a computer system to process colorants, by performing the following steps of:
   a) receiving a representation of a first colorant determined to correspond to a first color under a substantially reversible transformation,
   b) determining, in response to said representation of the first colorant, a representation of a second color which substantially matches the first color; and
   c) determining, in response to the representation of the second color, a representation of a second colorant which substantially matches the second color, and producing a colorant which substantially matches the first color.

28. The computer readable medium of claim 27, wherein the contents of the computer readable medium cause the computer system to perform step b) by performing the following substeps:
   i) receiving a sequence of colorant amounts which describes the first colorant as a weighting of primary colorants of a first colorant space; and
   ii) determining, in response to said sequence of colorant amounts, a sequence of color amounts which substantially matches said first color by weighting primary colors of a first color space.

29. The computer readable medium of claim 27, wherein the contents of the computer readable medium cause the computer system to perform step c) by performing the following substeps:
   i) receiving a sequence of color amounts which substantially matches said first color by weighting primary colors of a first color space; and
   ii) determining, in response to said sequence of color amounts, a second sequence of colorant amounts which substantially matches in a second colorant space said weighting of primary colors of the first color space.

* * * * *